US007753177B2

(12) United States Patent
Slager

(10) Patent No.: US 7,753,177 B2
(45) Date of Patent: Jul. 13, 2010

(54) WHEEL CHOCK ASSEMBLY

(76) Inventor: Rita Slager, P.O. Box 19, Camp Lake, WI (US) 53109

( * ) Notice: Subject to any disclaimer, the term of this patent is extended or adjusted under 35 U.S.C. 154(b) by 573 days.

(21) Appl. No.: 11/690,499

(22) Filed: Mar. 23, 2007

(65) Prior Publication Data
US 2008/0230329 A1 Sep. 25, 2008

(51) Int. Cl.
B61H 13/00 (2006.01)
(52) U.S. Cl. .......................... 188/36; 188/4 R
(58) Field of Classification Search .................. 188/36, 188/32, 37, 4 R, 5; 410/30; 70/226; 280/33.994
See application file for complete search history.

(56) References Cited
U.S. PATENT DOCUMENTS

| 1,592,192 | A |   | 7/1926  | Evans           |         |
|-----------|---|---|---------|-----------------|---------|
| 1,648,472 | A | * | 11/1927 | Avery, Jr.      | 157/1.11|
| 1,837,657 | A |   | 12/1931 | Fedderman       |         |
| 2,461,248 | A |   | 2/1949  | Wright          |         |
| 2,465,551 | A |   | 3/1949  | Otterness       |         |
| 2,522,328 | A |   | 9/1950  | Wiswell et al.  |         |
| 2,771,162 | A |   | 11/1956 | Marsh           |         |
| 2,844,909 | A |   | 7/1958  | Perchinsky      |         |
| 2,895,569 | A |   | 7/1959  | Nystrom         |         |
| 3,120,292 | A |   | 2/1964  | Rambat          |         |
| 3,297,111 | A |   | 1/1967  | Lisboa          |         |
| 3,391,760 | A |   | 7/1968  | Gonser          |         |
| 3,542,157 | A |   | 11/1970 | Noah            |         |
| 3,684,233 | A |   | 8/1972  | Vukich          |         |
| 3,695,071 | A | * | 10/1972 | West            | 70/225  |
| 3,811,536 | A |   | 5/1974  | Haynes          |         |
| 3,993,167 | A |   | 11/1976 | Reed            |         |
| 4,140,206 | A |   | 2/1979  | Yamazaki et al. |         |
| 4,186,823 | A |   | 2/1980  | White, Jr.      |         |
| 4,506,417 | A | * | 3/1985  | Hara            | 24/115 G|
| 4,638,744 | A |   | 1/1987  | Clive-Smith     |         |
| 4,649,724 | A |   | 3/1987  | Raine           |         |
| 4,679,818 | A |   | 7/1987  | Kakavas         |         |
| 4,711,325 | A |   | 12/1987 | Mountz          |         |
| 4,781,271 | A |   | 11/1988 | Wokeck          |         |
| 4,854,144 | A | * | 8/1989  | Davis           | 70/226  |
| 4,854,790 | A |   | 8/1989  | Andre           |         |
| 4,856,659 | A |   | 8/1989  | Krebs           |         |
| 4,895,225 | A |   | 1/1990  | Parnell         |         |
| 4,911,270 | A |   | 3/1990  | Hudson          |         |

(Continued)

Primary Examiner—Xuan Lan Nguyen
(74) Attorney, Agent, or Firm—Jansson Shupe & Munger Ltd.

(57) ABSTRACT

A wheel chock assembly is provided having a base member extending axially from a top end to a bottom end, first and second support members whose upper ends are pivotally and slidably engaged with respect to the base member, first and second wheel chocks mounted with respect to the lower ends of the support members, and an adjustment mechanism mounted to the base member. The adjustment mechanism is operatively engaged to the support members to achieve axial movement of their upper ends with respect to the base member to extend and retract them within a range that permits the assembly to grip the wheel of a cart between the wheel chocks. Preferably, the adjustment mechanism is a cord secured to the main member of the base member such that pulling the cord upward draws the main member into the handle of the base member, extending the support members outward, while releasing the cord withdraws the main member from the handle, retracting the support members inward. A method is also provided for securing the wheel of a cart.

17 Claims, 7 Drawing Sheets

U.S. PATENT DOCUMENTS

| | | | |
|---|---|---|---|
| 4,913,265 A * | 4/1990 | Richards | 188/32 |
| 5,069,311 A | 12/1991 | Young | |
| 5,210,903 A | 5/1993 | Horning | |
| 5,333,477 A * | 8/1994 | Davis | 70/226 |
| 5,383,639 A | 1/1995 | Byard | |
| 5,427,209 A | 6/1995 | Tannehill et al. | |
| 5,444,949 A | 8/1995 | Ciaccio | |
| 5,513,727 A | 5/1996 | Belanger | |
| D385,080 S | 10/1997 | Schueneman et al. | |
| 5,685,397 A | 11/1997 | Maddox et al. | |
| D389,796 S | 1/1998 | Olson | |
| 5,913,389 A | 6/1999 | Clark | |
| 5,927,108 A | 7/1999 | Pierce | |
| 5,927,443 A | 7/1999 | Collins, Jr. | |
| D420,277 S | 2/2000 | Burke et al. | |
| D439,720 S | 3/2001 | Lemon et al. | |
| 6,223,864 B1 | 5/2001 | Phelps et al. | |
| 6,290,029 B1 | 9/2001 | Gubler et al. | |
| 6,336,527 B1 | 1/2002 | Metz | |
| 6,378,956 B1 | 4/2002 | Van De Walker | |
| 6,386,331 B2 | 5/2002 | Scheffer | |
| 6,390,245 B1 | 5/2002 | Metz | |
| 6,425,465 B1 | 7/2002 | Tallman et al. | |
| 6,648,103 B2 | 11/2003 | Scheffer | |
| 6,742,752 B1 | 6/2004 | Fenyves et al. | |
| 6,755,599 B1 | 6/2004 | Plyler | |
| 6,938,734 B2 | 9/2005 | Curl | |
| 6,948,593 B2 * | 9/2005 | Horton | 188/36 |
| 7,032,720 B2 | 4/2006 | Jette et al. | |
| 7,036,637 B1 | 5/2006 | Wiens | |

* cited by examiner

WHEEL CHOCK ASSEMBLY

FIELD OF THE INVENTION

This invention is related generally to wheel chocks and, more particularly, to a portable wheel chock assembly for securing a wheel of a cart.

BACKGROUND OF THE INVENTION

Wheel chock assemblies are used to secure a wheel in place for a limited amount of time. Such assemblies in the prior art typically consist of flanges of a particular shape that interact with the wheel to keep it in a certain desired position. Examples of these prior art wheel chock assemblies are disclosed in the following United States patents: Pat. No. 3,120,292 (Rambat), Pat. No. 4,854,790 (Andre) and Pat. No. 6,378,956 (Van De Walker).

These wheel chock assemblies of the prior art have, however, a number of problems and shortcomings. They are often bulky, thereby making them difficult to transport and manage. Given the nature of the use of a wheel chock assembly, it has to be transported to the location where it is needed. While it would be desirable to store the wheel chock assembly in the trunk of a vehicle or other storage space, most wheel chock assemblies in the prior art are hard to manage since they usually require a large amount of storage space given their large size. This storage space could be allocated to other and better uses if the assembly was smaller. A wheel chock assembly that is easily collapsible would therefore be greatly appreciated not only for being conveniently portable but also for its advantages when stored between uses.

In addition, utilization of most wheel chock assemblies can be difficult and time consuming. There has therefore long been a need for a wheel chock assembly that is quick and easy to operate when the need for such a device arises. In particular, there have been many occasions where a shopper will be attempting to empty the contents of his or her shopping cart into the trunk of their vehicle when the wheeled cart begins to roll away from both the shopper and the vehicle. Not only does this make unloading the contents of the cart difficult, but oftentimes the cart rolls away unnoticed, colliding with other objects, including other vehicles. Having available a wheel chock assembly that is both simple to store and easy to use in such situations would be a great convenience to such individuals.

This invention meets these needs and overcomes other problems and shortcomings in the prior art with an apparatus that is simple and inexpensive to construct, not at all complicated to maintain, and also highly reliable to use.

SUMMARY OF THE INVENTION

This invention is for a wheel chock assembly that includes a base member extending axially from a top end to a bottom end, first and second support members where the upper ends of the support members are pivotally and slidably engaged with respect to the base member, first and second wheel chocks that are mounted with respect to the lower ends of the support members, and an adjustment mechanism mounted to the base member. The adjustment mechanism is operatively engaged to the support members to achieve axial movement of the upper ends with respect to the base member so that the support members can be extended and retracted within a range that permits its the assembly to obtain the desired spacing between the wheel chocks for gripping the wheel of a cart.

In certain preferred embodiments, the adjustment mechanism is a cord and the base member has a main member and a handle. The main member is sized to fit into the bottom opening of the handle. Most preferred is where both the main member and the handle are cylindrical in shape and the main member has an outside diameter less than the inside diameter of the handle. Highly desirable is where the handle has at least two sections telescopically connected to allow it to reversibly expand and collapse.

These preferred embodiments find the cord secured to the main member such that upward movement of the cord draws the main member within the handle which extends the support members outward and moving the cord downward withdraws the main member from the handle to retract the support members inward. More desirable is where the cord has proximal and distal ends, the proximal end extending outward from the top end of the handle and the distal end being attached to an upper portion of the main member. The terms "upward" and "downward" provide relative positioning with respect to a vertical dimension and are used in this application for ease in discussing the embodiments of the present invention although the wheel chock assembly can be used in a variety of orientations. Likewise, the terms "proximal" and "distal" also provide relative positioning with respect to the user of the wheel chock assembly and are similarly used in this application for ease in discussing the embodiments of the present invention.

Some desirable embodiments have the base member further including a plunger and compression spring. The plunger has a bore passing through it that is large enough to receive the cord. In these embodiments, the handle has a passageway that extends from the bottom opening to the top end and an aperture communicating with the passageway. The aperture is positioned radial or orthogonal to the axis of the passageway and is sized to receive the plunger. The spring is also radial to the passageway, abutting and in alignment with the plunger so that the plunger is biased by the spring to move outward away from the passageway. In addition, the cord extends from one end of the passageway to the other by way of the bore of the plunger. Therefore, pushing the plunger inward aligns the bore axially with the passageway to permit free axial movement of the cord within the passageway. Releasing the plunger, on the other hand, allows the plunger to retract outward from the passageway which crimps the cord within the aperture and prevents any axial movement of the cord since the aperture is sized so that it can snugly receive both the plunger and the cord.

In other desirable embodiments, the upper ends of the support members are pivotally secured to a slide-bar. The slide-bar extends through the lower end of the handle between the upper ends of the support members. In these embodiments, the main member has a slot along its upper portion that includes two longitudinal notches in radial alignment. Each notch is sized to slidably receive the slide-bar. Axial movement of the main member in one direction with respect to the handle, typically upward or downward, results in axial movement of the slide-bar within the slot in the opposite direction. The axial movement of the slide-bar is limited, however, by the length of the slot.

Most preferred is where the wheel chock assembly also includes first and second inner links. The inside ends of the links are pivotally secured adjacent to the lower portion of the main member. The outside ends of the links are pivotally connected at points proximal to the respective lower end of the first and second support members. In these embodiments, axial movement of the slide-bar in a downward direction (i.e., towards the distal end of the slot) forces the inner links outward from the main member, openly extending the support members. Axial movement of the slide-bar in the opposite or upward direction draws the inner links inward towards the main member, thereby collapsibly retracting the support members. Highly preferred embodiments find the inside ends of the inner links are joined by a torsion spring to cause the inner links to be drawn inward towards the main member by the spring.

In other embodiments that are desirable, each wheel chock is pivotally mounted to a respective support member so that the wheel chock is free to move between open and closed positions. More desirable is where the wheel chocks are cylindrical in shape.

Another aspect of this invention is directed to a method for securing the wheel of a cart. The method includes the steps of providing an assembly that is expandable to form a wheel-receiving space defined by wheel chocks; expanding the assembly; and gripping the wheel between the wheel chocks. The assembly has a base member, first and second support members pivotally and slidably engaged to the base member, first and second wheel chocks mounted to the lower ends of the first and second support members, and an adjustment mechanism mounted with respect to the base member that is operatively engaged to the support members to axially move them with respect to the base member A desired embodiment includes the step of adjusting the assembly spacing by extending and retracting the support members between certain limits to firmly grip the wheel between the wheel chocks. In certain cases, the step is added of unloading the contents of the cart with the wheel chock assembly firmly gripping the wheel.

Most preferred is where the adjustment mechanism is a cord and the adjusting step includes placing the wheel between the wheel chocks when the assembly is in the expanded position and lowering the cord to cause the support members to pivot inward to create a pinching effect on the wheel between the wheel chocks, thereby securely gripping the wheel between the wheel chocks. Highly desirable is where the wheel which is secured with the assembly is on a shopping cart.

DETAILED DESCRIPTION OF PREFERRED EMBODIMENTS

Figure 1:
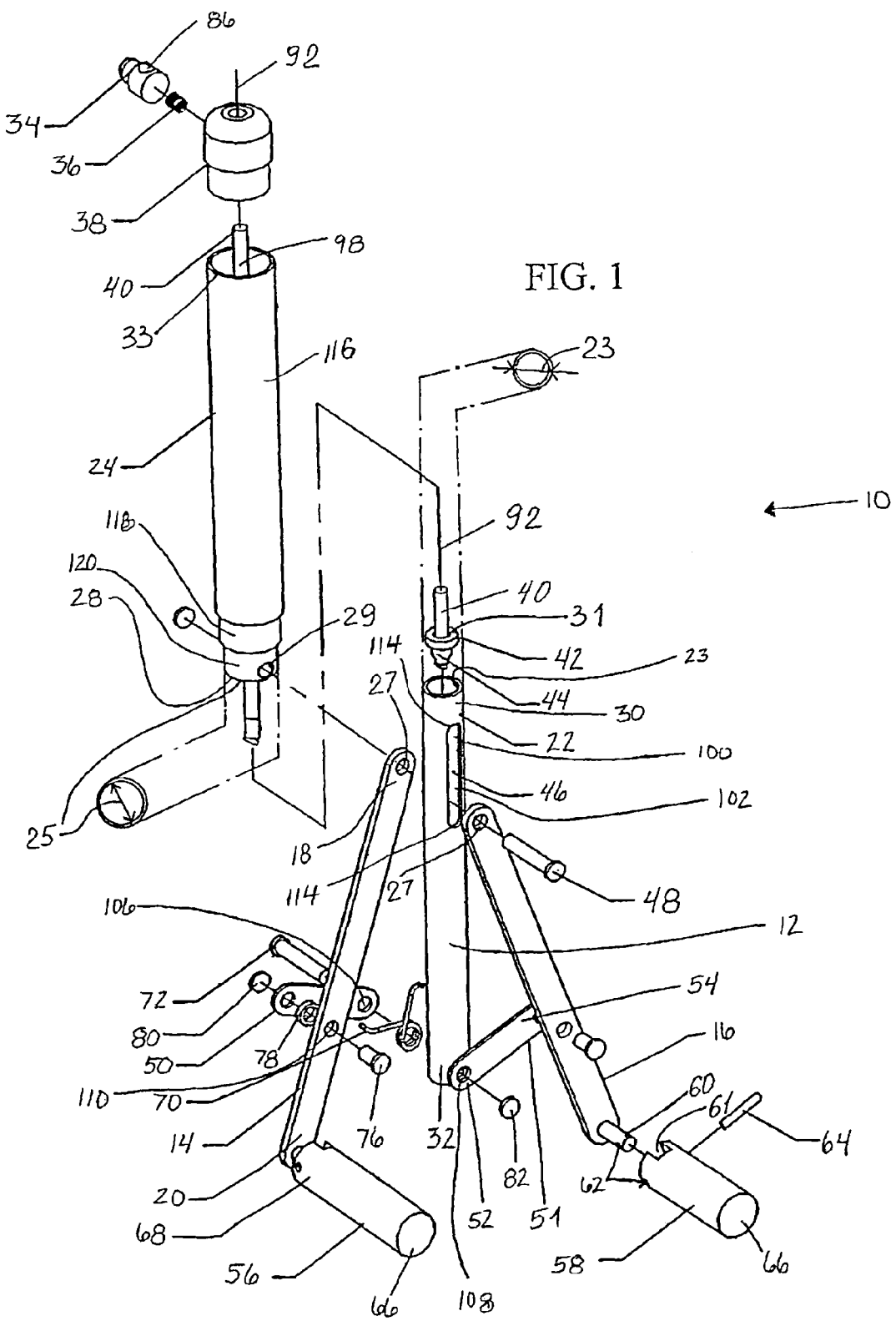
FIG. 1 is an exploded perspective view of a preferred wheel chock assembly in accordance with this invention.
Figure 3:
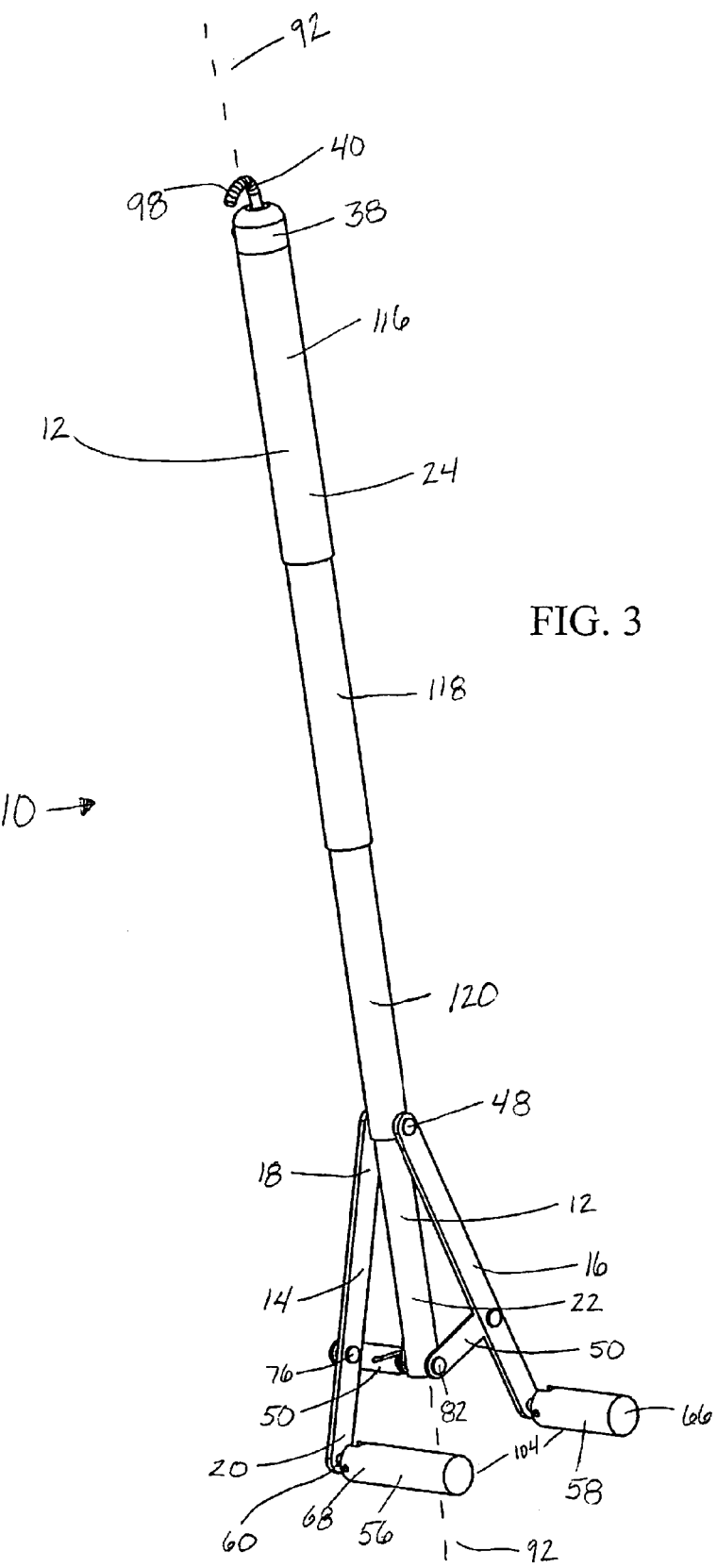
FIG. 3 is a front perspective view of the assembly in FIG. 1 in the open position.

FIG. 1 illustrates a wheel chock assembly 10 in accordance with this invention. As shown in FIGS. 1 and 3, the wheel chock assembly 10 is comprised of base member 12, first and second support members 14,16, first and second wheel chocks 56,58, and adjustment mechanism 98. Adjustment mechanism 98 in the preferred embodiment shown in FIGS. 1 and 3-7 is cord 40. Base member includes handle 24 and main member 22.

Figure 5:
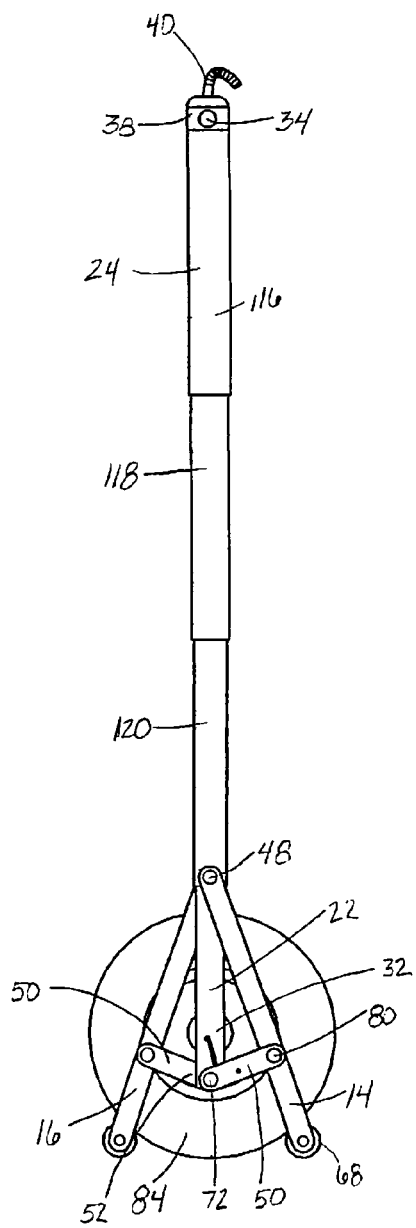
FIG. 5 is a back view of the assembly in FIG. 1 in the open position gripping a wheel.
Figure 6:
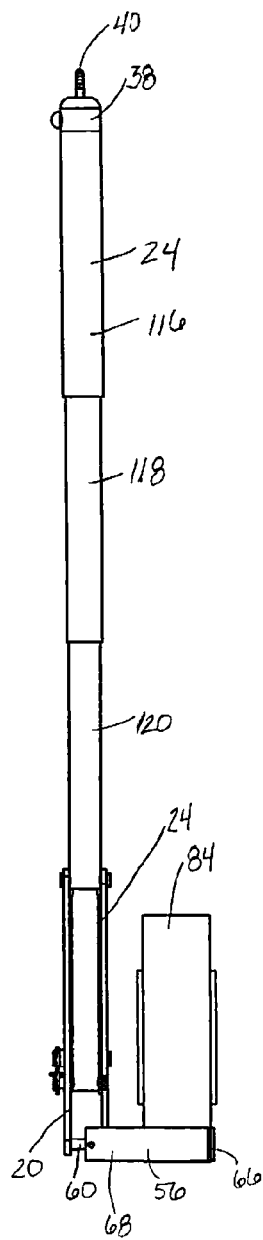
FIG. 6 is a side view of the assembly in FIG. 5.
Figure 7:
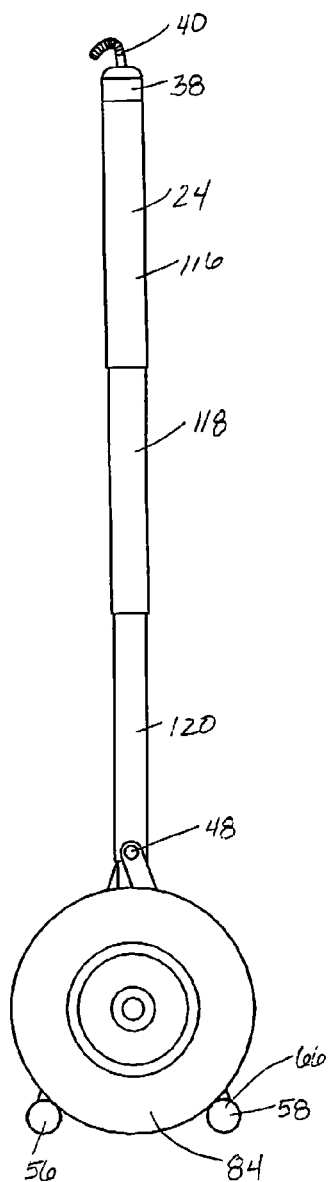
FIG. 7 is a front view of the assembly in FIG. 5.
Figure 8:
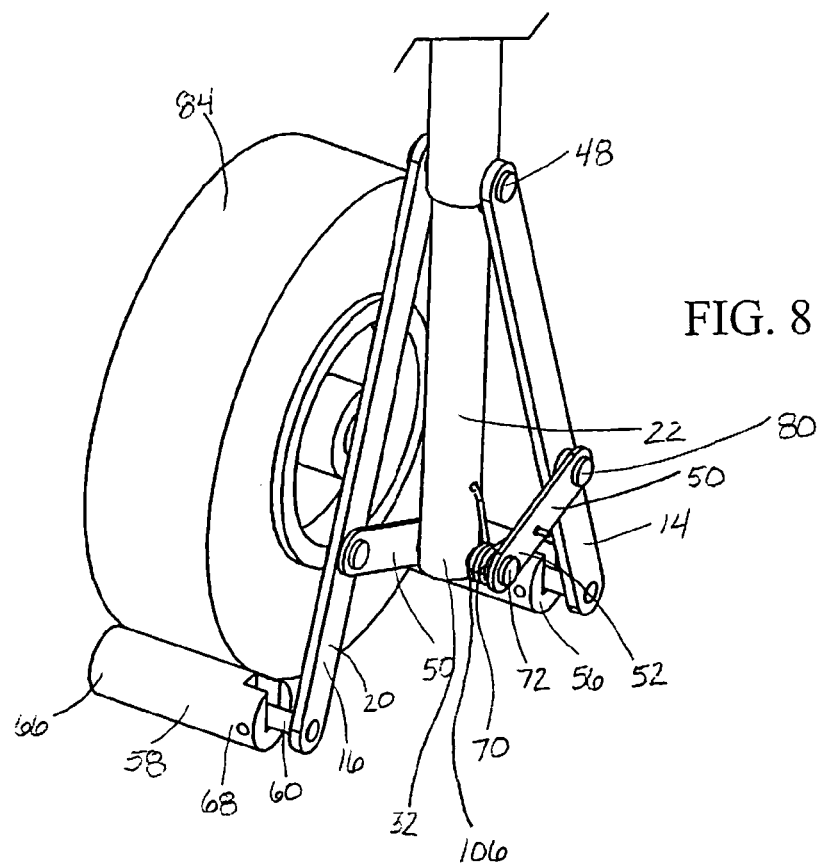
FIG. 8 is a fragmentary detailed view of the assembly in FIG. 1 illustrating from a back perspective the support members and the wheel chocks in the open position gripping a wheel.
Figure 9:
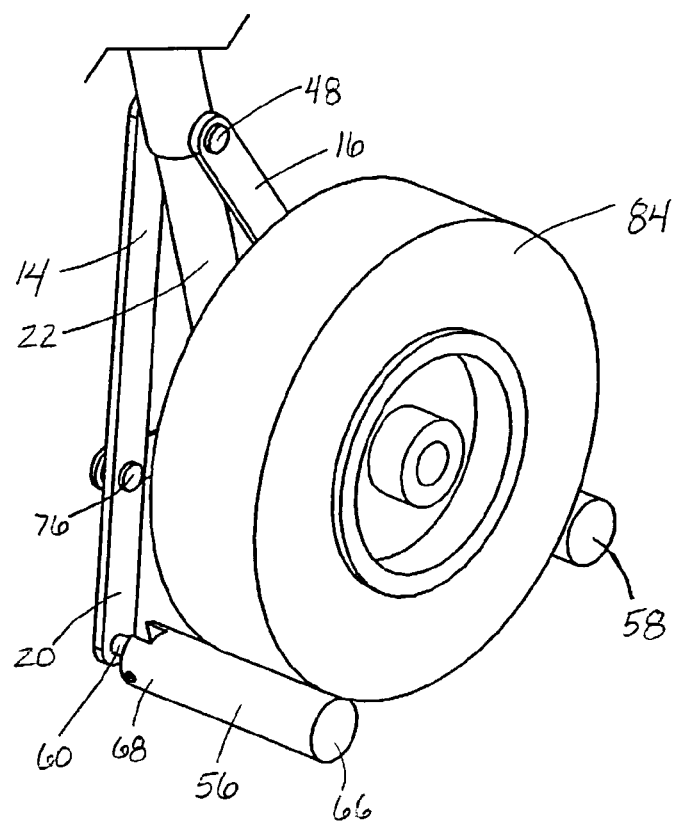
FIG. 9 is a fragmentary detailed view of the assembly in FIG. 1 illustrating from a front perspective the support members and the wheel chocks in the open position gripping a wheel.
Figure 10:
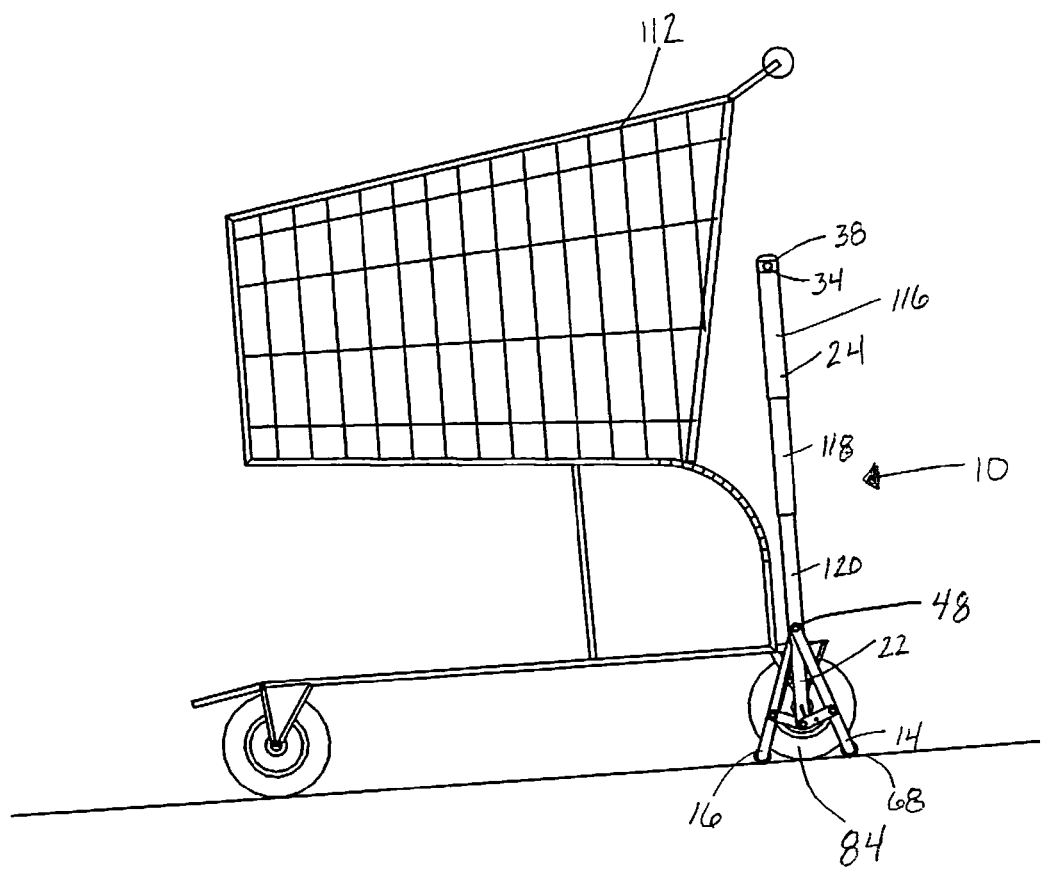
FIG. 10 is a side perspective view of a shopping cart illustrating the wheel chocks of the assembly in FIG. 1 in the open position gripping a wheel

Main member 22 fits securely within handle 24 as shown in FIGS. 3, 5 and 10. Main member 22 is cylindrical having outside diameter 23 that is less than the inside diameter 25 of cylindrical handle 24, thereby allowing main member 22 to be slidably received in bottom opening 28 of handle 24 as shown in FIG. 1. Main member 22 is oriented in a co-axial manner with handle 24 along axis 92 as illustrated in FIGS. 1 and 3.

Upper ends 18 of first and second support members 14,16 are pivotably connected to handle 24 by slide-bar 48. As illustrated in FIG. 1, slide-bar 48 first passes through hole 27 in upper end 18 of second support member 16. Next, slide-bar 48 passes through the first of two aligned apertures 29 (only one being shown) in handle 24. Since handle 24 is positioned over the proximal or upper portion 30 of main member 22, slide-bar 48 is free to pass through slot 46 in main member 22 and then through the remaining aperture 29. Finally, slide-bar 48 proceeds through hole 27 in upper end 18 of first support member 14 before being capped to secure slide-bar 48 with attached support members 14,16 to handle 24.

Slot 46, as seen in FIG. 1, has two identical notches 114 (only one being shown) in radial alignment along upper portion 30 of main member 22. Notches 114 are sized to slidably receive slide-bar 48. One skilled in the art will recognize that slide-bar 48 is free to axially move within slot 46 within the limits of notches 114. Top stop 100 and bottom stop 102 at both ends of notches 114 therefore define axial movement of slide-bar 48 within slot 46.

Cord 40 passes from main member 22 into handle 24 through hole 31 in main-member cap 42 securely mounted at the proximal end of main member 22. Cord 40 is secured to main member 22 at upper portion 30 by cord knot 44 distal to main-member cap 42 and sized not to pass through hole 31. Handle 24 has bottom opening 28 which allows cord 40 to pass into handle 24 and through handle 24 to cap 38 that frictionally fits upon top end 33 of handle 24.

Figure 2:
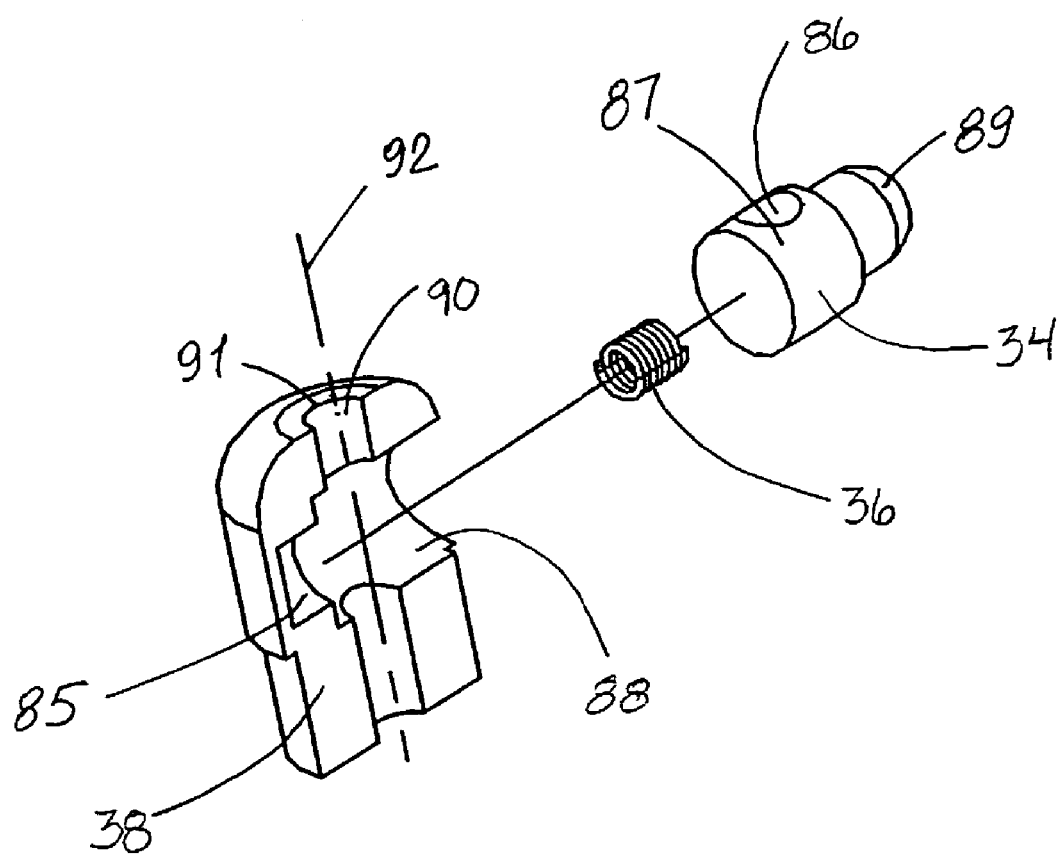
FIG. 2 is an exploded view of the cap, plunger and compression pin of the assembly in FIG. 1.

Plunger 34 and compression spring 36 are positioned within cap 38. FIG. 2 illustrates that cap 38 includes recess 85 and aperture 88. Compression spring 36 is seated within recess 85 which extends radially or orthogonal to passageway 90 of handle 24. Plunger 34 abuts compression spring 36 and is supported laterally within cap 38 by aperture 88. Aperture 88 communicates with the exterior of handle 24 and is positioned opposite to recess 85, also extending orthogonal to passageway 90. Aperture 88 allows plunger 34 to have its distal portion 87 extend into passageway 90 while its proximal portion 89 protrudes outward from handle 24. One skilled in the art will recognize that plunger 34 is biased to move outward through aperture 88 by compression spring 36 and that pushing plunger 34 inward to expose more of distal portion 87 to passageway 90 requires compression of spring 36.

Distal portion 87 of plunger 34 includes bore 86. Bore 86 extends linearly through distal portion 87 and is cylindrical in shape, having a diameter large enough to slidably receive cord 40. Cord 40 extends through passageway 90 which runs through the center of handle 24 from bottom opening 28 through cap 38 at top end 33. In cap 38, passageway 90 passes axially from bottom to top. Cord 40 enters through the bottom of passageway 90 and proceeds through bore 86 before exiting cap 38 and extending outward from handle 24 at top opening 91.

When plunger 34 is pushed inward, plunger 34 aligns bore 86 with passageway 90, allowing cord 40 to move freely within passageway 90. When plunger 34 is released, plunger 34 moves outward by action of compression spring 36 to crimp cord 40 outside of bore 86 at both of its ends between plunger 34 and the inner walls of aperture 88. One skilled in the art will recognize that once cord 40 is crimped by plunger 34, cord 40 is no longer able to move axially in either direction, maintaining main member 22 in its position with respect to handle 24. Aperture 88 is sized so that it can receive plunger 34 and cord 40 but still securely pinch cord 40 when drawn within it by plunger 34.

Handle 24 consists of three telescoping sections, first extension 116, second extension 118 and third extension 120 as shown in FIGS. 3-7 and 10. This allows handle 24 to extend and collapse axially. The telescoping nature of handle 24 allows users of wheel chock assembly 10 to adjust handle 24 for ease of use.

As illustrated in FIG. 1, support members 14,16 are pivotally connected to main member 22 by inner links 50,51. Inside end 52 of each inner link 50,51 is pivotably secured to bottom or distal end 32 of main member 22 by assembly pin fastener 72. Assembly pin fastener 72 passes through hole 106 on inside end 52 of first inner link 50 before extending through torsion spring 70. Assembly pin fastener 72 finally proceeds through apertures 108 in registry at bottom end 32 (only one being shown) before finally passing through inside end 52 of second inner link 51. Inside pin 82 secures the end of assembly pin fastener 72.

Outside ends 54 of inner links 50,51 are pivotally secured at points proximal to lower end 20 of first and second support members 14,16. Outside ends 54 are connected to support members 14,16 by pins 76, cylindrical nut 78 and end piece 80 as shown in FIG. 1. Each pin 76 passes through support hole 110 in support member 14,16, through cylindrical nut 78, and then through inner link 50,51. End piece 80 caps pin 76 to secure outside end 54 of each inner link 50,51 to its respective support member 14,16.

As illustrated in FIGS. 1, 3-6 and 8-9, first and second wheel chocks 56,58 are pivotably secured to lower ends 20 of first and second support members 14,16. Attached end 68 of each wheel chock 56,58 is pivotably connected to cylindrical protrusion 60. Cylindrical protrusion 60 extends outward from lower end 20 of each support member 14,16 and is received into pivot slot 61 on attached end 68. Pivot pin 64 is then pushed into pivot holes 62 in linear alignment extending through both attached end 68 and protrusion 60, thereby pivotably securing first and second wheel chocks 56,58 to first and second support members 14,16.

Figure 4:
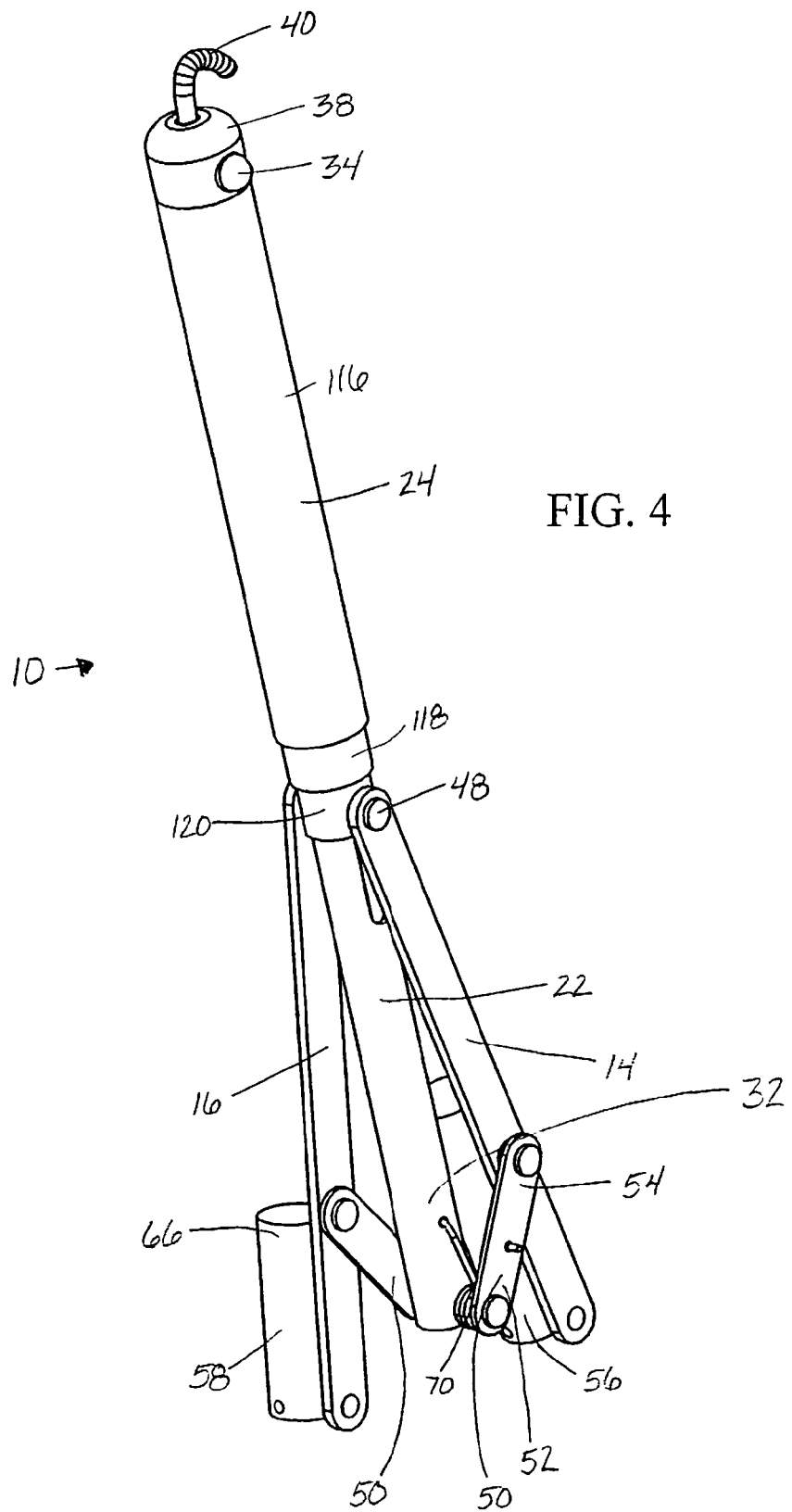
FIG. 4 is a back perspective view of the assembly in FIG. 1 in the closed position.

Attached end 68 of each wheel chock 56,58 can be pivoted so that free end 66 is positioned adjacent to the respective support member 14,16 to which wheel chock 56,58 is attached as shown in FIG. 4. Pivotability of wheel chocks 56,58 may be optional in that wheel chocks 56,58 can always remain in an open position as seen in FIGS. 1, 3, 5-10.

Upper movement of cord 40 draws main member 22 into handle 24, causing slide-bar 48 positioned at the bottom of handle 24 to pass downward within slot 46. When slide-bar 48 is moved in a downward direction, inner links 50,51 are forced outward from main member 22 as shown in FIGS. 3, 5, 8, 9-10. This movement causes first and second support members 14,16 to open in an outward direction, thereby creating a wide wheel receiving space 104 (defined as the space between first and second wheel chocks 56,58) as illustrated in FIG. 3.

Downward movement of cord 40, on the other hand, allows main member 22 to drop or withdraw from handle 24, causing handle 24 to thereby move upward with respect to main member 22. This relative movement by handle 24 results in slide-bar 48 to rise upward within slot 46. When slide-bar 48 is moved in an upward direction, inner links 50,51 are pulled inward towards main member 22. Support members 14,16 with their attached wheel chocks 56, 58 are in turn drawn inward, reducing or, when collapsed, eliminating wheel receiving space 104 as seen in FIG. 4. This narrowing of wheel receiving space 104 permits wheel 84 of shopping cart 112 to be held firmly between wheel chocks 56,58 as shown in FIGS. 5-10.

One skilled in the art will therefore readily see that axial movement of main member 22 in a first direction with respect to handle 24 results in axial movement of slide-bar 48 within slot 46 in an opposite second direction. Slide-bar 48 will thus always move in a direction opposite to that of the movement of main member 22.

First and second support members 14,16 are preferably flat bars chosen to have a desired length when extended outward from base member 12. These bars also have sufficient width to attach to first and second wheel chocks 56,58 but a narrow depth so that when first and second support members 14,16 are retracted, they are able to lie flat or nest against the exterior of main member 22 as illustrated in FIG. 4.

Among its many uses, wheel chock assembly 10 can secure wheel 84 on shopping cart 112 in a parking lot as shown in FIG. 10. Wheel chock assembly 10 is easily stored in a vehicle trunk. Once an individual is done shopping, wheel chock assembly 10 is removed from the vehicle trunk and expanded outward as illustrated in FIG. 3. Wheel chock assembly 10 is expanded by pushing in on plunger 34 to pull upward on cord 40. This draws main member 22 within handle 24, thereby extending first and second support members 14,16 outward. Handle 24 can then be expanded telescopically as shown in FIG. 3 to a length that is comfortable to the individual. The user then moves first and second wheel chocks 56, 58 into their open position, i.e., where free end 66 of each wheel chock 56,58 is extended outward as illustrated in FIGS. 1, 3, 5-10 and is not adjacent to or nesting against first and second support members 14,16.

As shown in FIGS. 5-10, the individual then places wheel 84 in the space between first and second wheel chocks 56,58. Cord 40 is now released in a downward direction, causing main member 22 to withdraw from handle 24 and retracting support members 14,16 to have wheel chocks 56,58 firmly grip wheel 84 as seen in FIGS. 5-10. At this point, the user releases the pressure that had been placed upon plunger 34, allowing plunger 34 to move outward from handle 24, crimping cord 40 within aperture 88 so that support members 14,16 and thereby wheel chocks 56,58 are held in this desired position.

Once wheel 84 is gripped as illustrated in FIG. 10, the contents of cart 112 are unloaded. After the contents of cart 112 are unloaded, the user pushes plunger 34 inward again to cause bore 86 to return to an axial alignment with passageway 90, thereby permitting movement of cord 40 within passageway 90. The individual then allows cord 40 to proceed in a downward direction, thereby having main member 22 drop from handle 24. This retracts first and second support members 14,16 until they are nesting against main member 22 as shown in FIG. 4. Furthermore, this results in inner links 50 being positioned so that outside ends 54 are angled upward towards handle 24. First and second wheel chocks 56,58 can then be moved by the user into their closed position so that free ends 66 rest adjacent to first and second support members 14,16. Wheel chock assembly 10 is then stored, preferably in the trunk of the vehicle, until its next use.

A wide variety of materials are available for the various parts discussed and illustrated herein. Although the invention have been shown and described in conjunction with specific embodiments thereof, it is to be understood that many alternatives, modifications and variations will be apparent to those skilled in the art. Accordingly, it is intended to embrace all such alternatives, modifications and variations that fall within the spirit and broad scope of the appended claims.

The invention claimed is:

1. A wheel chock assembly comprising:
   a base member having an axis extending from a top end to a bottom end the base member including a main member and a handle, the main member being sized to be received in a bottom opening of the handle and a cord being secured to the main member, upper movement of the cord draws the main member within the handle to extend first and second support members outward and downward movement of the cord withdraws tile main member from the handle to retract the support members inward;
   said first and second support members, each support member having upper and lower ends the upper ends being pivotally and slidably engaged with respect to the base member, the upper ends of the support members being pivotally secured to a slide-bar, the slide-bar extending through a lower end of the handle between the upper ends of the support members, the lower ends of the support members being secured to first and second inner links having inside and outside ends the inside ends being pivotally secured by a torsion spring;
   first and second wheel chocks mounted with respect to the respective lower end of the first and second support members; and
   an adjustment mechanism including said cord mounted with respect to the base member and operatively engaged to the first and second support members for axial movement of the upper ends of the support members with respect to the base member,
   whereby the first and second support members being extended and retracted between limits to permit a range of spacing between the wheel chocks for the gripping of a wheel on a cart between the wheel chocks.

2. The wheel chock assembly of claim 1 wherein the cord has proximal and distal ends, the proximal end extending outward from the top end and the distal end being secured to an upper portion of the main member.

3. The wheel chock assembly of claim 1 wherein:
   the base member further includes a plunger and compression spring, the plunger having a bore extending therethrough, the bore being sized to receive the cord;
   the handle defines a passageway connecting the bottom opening with the top end and includes an aperture communicating with the passageway, the aperture being positioned radial to the passageway and receiving the plunger therein, the spring being positioned radial to the passageway and abutting and being in alignment with the plunger such that the plunger is biased to move outward from the passageway by the compression spring: and
   the cord extends through the passageway and through the bore,
   whereby pushing the plunger inward aligns the bore axially with the passageway so as to permit free axial movement of the cord within the passageway and releasing the plunger allows the plunger to retract outward so as to crimp the cord within the aperture to prevent axial movement of the cord, the aperture being sized to snugly receive the plunger and the cord.

4. The wheel chock assembly of claim 1 wherein the main member has a slot having a length, the slot including two longitudinal notches in radial alignment along an upper portion of the main member, each notch being sized to slidably receive the slide-bar, whereby axial movement of the main member in a first direction with respect to the handle results in axial movement of the slide-bar within the slot in an opposite second direction, the axial movement of the slide-bar being limited by the length of the slot.

5. The wheel chock assembly of claim 4 wherein the inside ends of the first and second inner links are pivotally secured by said torsion spring adjacent to the lower portion of the main member and the first and second outside ends being pivotally connected at a point proximal to the respective lower end of the first and second support members, whereby axial movement of the slide-bar in a downward direction forces the inner links outward from the main member to openly extend the support members, the inner links are biased to be drawn inward towards the main member by the torsion spring, and axial movement of the slide-bar in an upward direction draws the inner links inward towards the main member to collapsibly retract the support members.

6. The wheel chock assembly of claim 1 wherein the handle is provided with at least two sections telescopically connected to allow the handle to reversibly expand and collapse axially.

7. The wheel chock assembly of claim 1 wherein the main member and handle are cylindrical in shape, the main member having an outside diameter less than an inside diameter of the handle, the main member being received in the bottom opening of the handle.

8. The wheel chock assembly of claim 1 wherein the support members are bars.

9. The wheel chock assembly of claim 1 wherein each wheel chock is pivotally mounted to said each respective support member the wheel chocks move between open and closed positions.

10. The wheel chock assembly of claim 1 wherein the wheel chocks are cylindrical.

11. A method for securing a wheel of a cart, the method comprising:
    providing an assembly that is expandable to form a wheel-receiving space defined by wheel chocks, the assembly having a base member with an axis, first and second support members pivotally and slidably engaged with respect to the base member, first and second wheel chocks mounted at the lower ends of the first and second support members, and an adjustment mechanism mounted with respect to the base member and operatively engaged to the support members for axial movement of the support members with respect to the base member, the adjustment mechanism includes a cord and the base member includes a main member and a handle, the main member being sized to be received in a bottom opening of the handle and the cord being secured to the upper portion of the main member;
    expanding the assembly;
    adjusting the assembly spacing to firmly grip the wheel of a cart by drawing and withdrawing the cord to expand and retract, respectively, the first and second support members between upper and lower notches of a slot in an upper portion of the main member to grip the wheel of a cart between the wheel chocks; and gripping the wheel of a cart between the wheel chocks.

12. The method of claim 11 wherein drawing the cord to move the main member withen the handle to extend the first and second support members outward, a downward movement of the cord withdraws the main member from the handle to retract the support members inward to allow the wheel chocks to grip the wheel.

13. The method of claim 12 wherein adjusting the assembly spacing to firmly grip the wheel includes placing the wheel between the wheel chocks when the assembly is in the expanded position, lowering the cord causing the support members to pivot inward creating a pinching effect on the wheel between the wheel chocks, thereby securely gripping the wheel between the wheel chocks.

14. The method of claim 12 wherein the handle is provided with at least two sections telescopically connected to allow the handle to reversibly expand and collapse axially.

15. The method of claim 11 further comprising unloading the contents of the cart with the wheel chock assembly firmly gripping the wheel.

16. The method of claim 11 wherein the base member further includes:

a plunger and compression spring, the plunger having a bore extending therethrough, the bore being sized to receive the cord;

the handle defines a passageway connecting the bottom opening with the top end and includes an aperture communicating with the passageway, the aperture being positioned radial to the passageway and receiving the plunger therein, the spring being positioned radial to the passageway and abutting and being in alignment with the plunger, the plunger is biased to move outward from the passageway by the compression spring; and the cord extends through the passageway and through the bore, pushing the plunger inward aligns the bore axially with the passageway to permit free axial movement of the cord within the passageway and releasing the plunger allows the plunger to retract outward to crimp the cord within the aperture to prevent axial movement of the cord, the aperture being sized to snugly receive the plunger and the cord.

17. The method of claim 11 wherein the cart is a shopping cart.

* * * * *

UNITED STATES PATENT AND TRADEMARK OFFICE
CERTIFICATE OF CORRECTION

PATENT NO. : 7,753,177 B2  Page 1 of 1
APPLICATION NO. : 11/690499
DATED : July 13, 2010
INVENTOR(S) : Rita Slager It is certified that error appears in the above-identified patent and that said Letters Patent is hereby corrected as shown below:

Column 7, line 16, after "end", insert --,--.
Column 7, line 22, after "withdraws", delete "tile" and insert --the--.
Column 7, line 26, after "upper and lower ends", insert --,--.
Column 7, line 33, after "inside and outside ends", insert --,--.
Column 7, line 67, after "passageway", delete "so as".
Column 8, line 2, after "outward", delete "so as".
Column 8, line 40, after "member", insert --,--.
Column 9, line 3, after "member", delete "withen" and insert --within--.

Signed and Sealed this

Fourteenth Day of September, 2010

David J. Kappos
*Director of the United States Patent and Trademark Office*